US008205257B1

United States Patent
Satish et al.

(10) Patent No.: US 8,205,257 B1
(45) Date of Patent: *Jun. 19, 2012

(54) SYSTEMS AND METHODS FOR PREVENTING THREATS ORIGINATING FROM A NON-PROCESS BASED COMPONENT HOSTED BY A TRUSTED PROCESS

(75) Inventors: Sourabh Satish, Fremont, CA (US); Shane Pereira, Newbury Park, CA (US); Uri Mann, Oak Park, CA (US)

(73) Assignee: Symantec Corporation, Mountain View, CA (US)

( * ) Notice: Subject to any disclaimer, the term of this patent is extended or adjusted under 35 U.S.C. 154(b) by 421 days.

This patent is subject to a terminal disclaimer.

(21) Appl. No.: 12/510,828

(22) Filed: Jul. 28, 2009

(51) Int. Cl.
H04K 1/00 (2006.01)
(52) U.S. Cl. ............... 726/22; 726/23; 726/24; 726/25; 713/152; 713/164; 713/166
(58) Field of Classification Search ............ 726/22–24
See application file for complete search history.

(56) References Cited

U.S. PATENT DOCUMENTS

| | | | | |
|---|---|---|---|---|
| 6,070,244 A * | 5/2000 | Orchier et al. | ........... | 726/1 |
| 7,146,644 B2 * | 12/2006 | Redlich et al. | ........... | 726/27 |
| 7,530,106 B1 * | 5/2009 | Zaitsev et al. | ........... | 726/24 |
| 7,549,162 B2 * | 6/2009 | Aaron | ........... | 726/12 |
| 7,551,073 B2 * | 6/2009 | Gavin | ........... | 340/506 |
| 7,720,965 B2 * | 5/2010 | Kaditz et al. | ........... | 709/224 |
| 8,051,478 B1 * | 11/2011 | Rajan et al. | ........... | 726/22 |
| 8,107,625 B2 * | 1/2012 | Boland et al. | ........... | 380/37 |
| 2002/0099959 A1 * | 7/2002 | Redlich et al. | ........... | 713/201 |
| 2003/0028655 A1 * | 2/2003 | Owhadi | ........... | 709/229 |
| 2004/0177269 A1 * | 9/2004 | Belnet et al. | ........... | 713/200 |
| 2004/0205474 A1 * | 10/2004 | Eskin et al. | ........... | 715/500 |
| 2004/0210772 A1 * | 10/2004 | Hooker et al. | ........... | 713/201 |
| 2005/0033980 A1 * | 2/2005 | Willman et al. | ........... | 713/200 |
| 2005/0223239 A1 * | 10/2005 | Dotan | ........... | 713/188 |
| 2005/0273605 A1 * | 12/2005 | Saha et al. | ........... | 713/166 |
| 2005/0283622 A1 * | 12/2005 | Hall et al. | ........... | 713/190 |
| 2007/0033652 A1 * | 2/2007 | Sherwani et al. | ........... | 726/26 |
| 2007/0079371 A1 * | 4/2007 | Laird-McConnell | ........... | 726/22 |
| 2007/0226797 A1 * | 9/2007 | Thompson et al. | ........... | 726/22 |
| 2008/0114957 A1 * | 5/2008 | Safa | ........... | 711/163 |
| 2008/0168531 A1 * | 7/2008 | Gavin | ........... | 726/1 |
| 2008/0250406 A1 * | 10/2008 | Carpenter et al. | ........... | 718/1 |
| 2009/0061897 A1 * | 3/2009 | Hamilton et al. | ........... | 455/456.2 |
| 2009/0089579 A1 * | 4/2009 | Murase et al. | ........... | 713/164 |
| 2009/0119776 A1 * | 5/2009 | Palnitkar et al. | ........... | 726/25 |

(Continued)

OTHER PUBLICATIONS

Rabaiotti, "Counter Intrusion Software—Malware Detection using Structural and Behavioural Features and Machine Learning," Cardiff University, Aug. 2007, pp. 1-190.*

(Continued)

Primary Examiner — Luu Pham
(74) Attorney, Agent, or Firm — Holland & Hart LLP (57) ABSTRACT

A computer-implemented method for preventing threats originating from a non-process based component hosted by a trusted process is described. The loading activity of the trusted process is monitored. A trust level associated with the trusted process is altered when an unverified component is loaded into the trusted process. Events performed by the trusted process are monitored. An unverified component that originated the event is identified. The trusted process is terminated based on a security risk associated with the unverified component that originated the event.

14 Claims, 6 Drawing Sheets

U.S. PATENT DOCUMENTS

| | | | |
|---|---|---|---|
| 2009/0265756 A1* | 10/2009 | Zhang et al. | 726/1 |
| 2009/0288161 A1* | 11/2009 | Wei et al. | 726/22 |
| 2010/0185845 A1* | 7/2010 | Takayama et al. | 713/2 |
| 2010/0199357 A1* | 8/2010 | Hoffman et al. | 726/27 |

OTHER PUBLICATIONS

Moffie et al, "Hunting Trojan Horses," NUCAR Technical Report, Jan. 2006, pp. 1-46.*

Tevis, "Automatic Detection of Software Secruity Vulnerability in Executable Program Files," Auburn University, Aug. 2005, pp. 5-420.*

Klinkoff et al, "Extending .NET Secrutiy to Unmanaged Code," Springer-Verlag Berlin Heidelberg, 2006, pp. 1-16.*

Schmid et al., "Preventing the Execution of Unauthorized Win32 Applications," IEEE, 2001, pp. 175-184.*

* cited by examiner

SYSTEMS AND METHODS FOR PREVENTING THREATS ORIGINATING FROM A NON-PROCESS BASED COMPONENT HOSTED BY A TRUSTED PROCESS

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

The need for reliable security techniques to secure data stored within a computer system has also increased dramatically. Malicious software has been developed to infiltrate and avoid these security techniques. This malicious software (commonly known as "malware") may be designed to cause harm or data loss. For example, some malware has been designed to destroy files on a hard disk, or to corrupt the file system of a computer by writing invalid data. Malware has also been designed for profit-driven motives. For example, some malware is designed to take control of a users' computer. Malware may also be designed to monitor users' web browsing, display unsolicited advertisements, etc.

The creators of these various forms of malware desire the malware to remain undetected by the security techniques implemented by a computer system. Malware designers may attempt to hide or bury the malware in applications or functions on the computer system that remain unchecked by the security techniques. As shown by the above discussion, benefits may be realized by providing improved systems and methods for preventing threats originating from a malware component that is hosted by a trusted process that is not monitored by the security techniques implemented by the computer system.

SUMMARY

A computer-implemented method for preventing threats originating from a non-process based component hosted by a trusted process is described. The loading activity of the trusted process is monitored. A trust level associated with the trusted process is altered when an unverified component is loaded into the trusted process. Events performed by the trusted process are monitored. An unverified component that originated the event is identified. The trusted process is terminated based on a security risk associated with the unverified component that originated the event.

In one embodiment, the unverified component that originated the event is deleted. The unverified component may be a non-process based dynamic link library ("DLL"). In one configuration, a trust level may be assigned on an image file to the unverified component. The trust level assigned to the unverified component may be based on a digital signature of the component.

A monitored event may include a system configuration setting modification, a portable executable ("PE") file modification, a PE file deletion, or a PE file creation. In one embodiment, execution call sequence tracing may be performed to identify the unverified component that originated the event.

In one example, the security risk associated with the identified unverified component may be evaluated based on a run time event associated with the unverified component. In another example, the security risk associated with the identified unverified component may be evaluated based on static characteristics possessed by the unverified component in a static file format. The unverified component may include a non-process based plug-in or a non-process based extension to the trusted process.

A computer system configured to prevent threats originating from a non-process based component hosted by a trusted process is also described. The computer system may include a processor and memory in electronic communication with the processor. The computer system may also include a security module configured to monitor loading activity of the trusted process, and alter a trust level associated with the trusted process when an unverified component is loaded into the trusted process. The module may be further configured to monitor events performed by the trusted process, and identify an unverified component that originated the event. The module may be further configured to terminate the trusted process based on a security risk associated with the unverified component that originated the event.

A computer-program product for preventing threats originating from a non-process based component hosted by a trusted process is also described. The computer-program product may include a computer-readable medium having instructions thereon. The instructions may include code programmed to monitor loading activity of the trusted process, and code programmed to alter a trust level associated with the trusted process when an unverified component is loaded into the trusted process. The instructions may also include code programmed to monitor events performed by the trusted process, and code programmed to identify an unverified component that originated the event. The instructions may further include code programmed to terminate the trusted process based on a security risk associated with the unverified component that originated the event.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

An increasing variety of malicious software ("malware") are infiltrating and damaging computing systems. One form of infiltration involves the malware dropping non-process based components into a trusted process (i.e., trusted software) installed on a computer system. Malware may inject the non-process components into a trusted process by registering the components as an extension of the trusted process. In addition, the malware may insert the components via a direct code injection technique. After the components have been injected into the trusted process, the process may act as a host for these non-process based components. Infiltrating trusted processes presents a major challenge to the security of a computer system. Computer systems may use a security mechanism (such as security software) to monitor the activities on the system. The mechanism may challenge a process running on the system if suspicious activity appears to be originating from the process. Trusted processes, however, are typically not challenged by the security mechanism for any activity they perform on a system. In other words, non-processed based components hosted by a trusted process may execute malicious activities on the computer system without being challenged by the security mechanism.

Examples of non-process based components may include dynamically linked libraries ("DLLs"). The DLLs may be injected into a trusted process and the security software that monitors the trusted process is not likely to monitor or challenge malicious behavior on behalf of the trusted process. The chances of DLLs surviving the challenges presented by security software are significantly increased. For example, many varieties of malware inject DLLs as extensions for Winlogon, browsers, etc. These DLLs may be injected under the guise of providing a DLL service. The DLLs may be injected into a trusted process such as "svchost.exe". In other words, svchost.exe may act as the host and cause the DLLs to run on the computer system. These DLLs may go undetected and unchallenged by the security software because they are injected into and hosted by a trusted process.

In one embodiment, the present systems and methods may combat threats originating from non-process based components by altering the security software to monitor (and challenge) trusted processes. For example, the security software may begin to monitor a trusted process when the security software observes the trusted process loading external suspicious components. The security software may then trace back malicious activity to the suspicious components to detect and convict the components when a security risk to the computer system has risen to a predetermined level.

Figure 1:
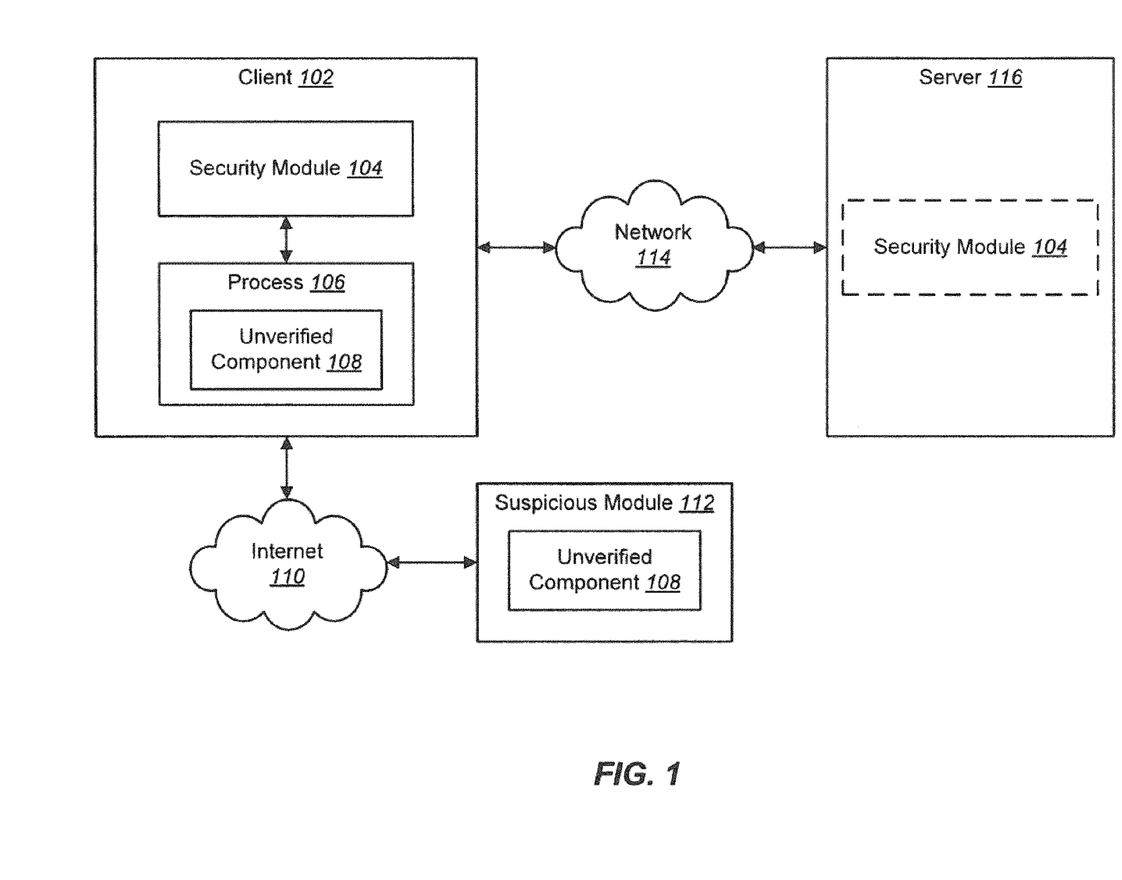
FIG. 1 is a block diagram illustrating one embodiment of a client computing device that may implement the present systems and methods.

FIG. 1 is a block diagram illustrating one embodiment of a client computing device 102. In one example, the client 102 may be, without limitation, a workstation, a laptop, a personal digital assistant ("PDA"), a handheld device, or any other type of computing system or device.

In one configuration, the client 102 may include a security module 104. The client 102 may also include a process 106. In one example, the security module 104 may monitor certain attributes and actions associated with the process 106.

In one embodiment, the client 102 may communicate with additional devices or modules via the Internet 110. In one example, a suspicious module 112 may communicate with the client 102 via the internet 110. The suspicious module 112 may include malware or some other type of malicious software. The suspicious module 112 may inject an unverified component 108 into the process 106 through the Internet connection 110. In one configuration, the process 106 may load the unverified component 108 through the Internet connection 110.

In one example, the process 106 may be a verified or trusted process whereas the unverified component 108 may a non-process based component that has not been previously verified by the security module 104. An example of a non-process based component may be a DLL, a plug-in, an extension, etc.

In another embodiment, a server 116 may include the security module 104 that monitors the process 106. For example, the security module 104 on the server 116 may monitor the process 106 running on the client 102 via a network connection 114.

Figure 2:
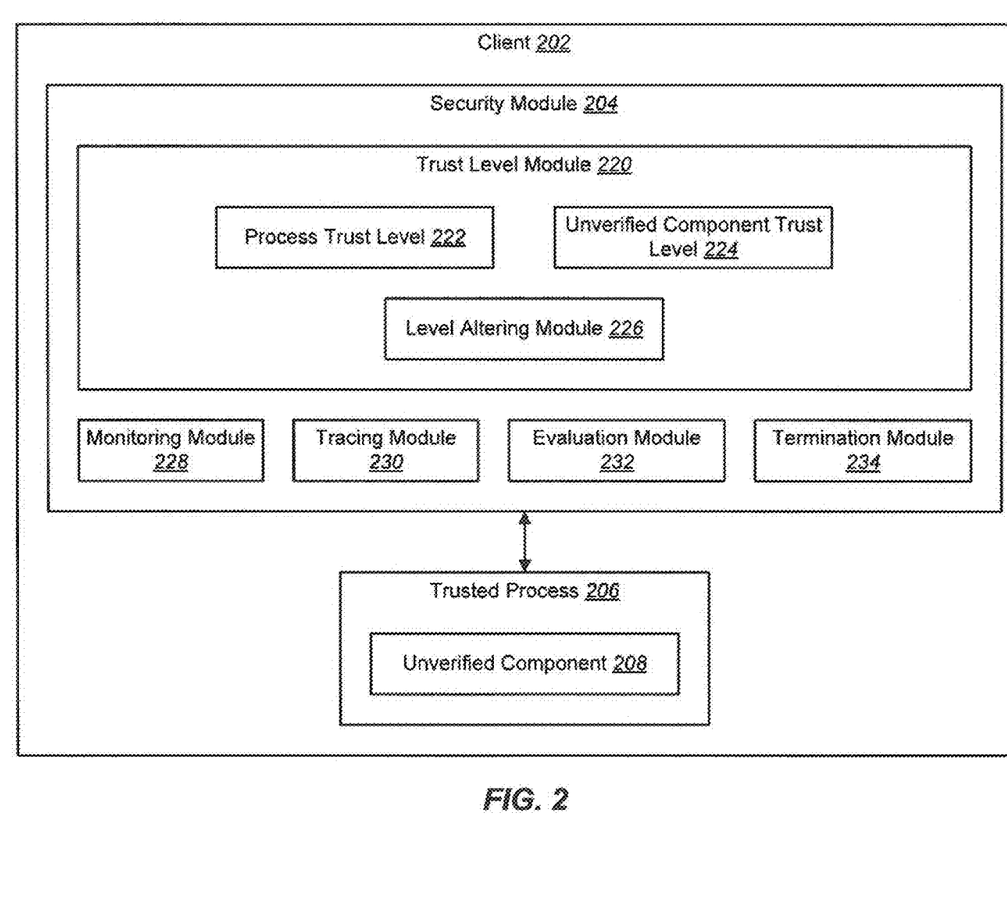
FIG. 2 is a block diagram illustrating a further embodiment of a client computing device.

FIG. 2 is a block diagram illustrating a further embodiment of a client computing device 202. In one configuration, the client 202 may include a security module 204 that monitors a trusted process 206. The process 206 may be trusted in that the security module 204 may not monitor or challenge the activity originating from the process 206.

In one example, the security module 204 may include a trust level module 220. The trust level module 220 may include a trust level 222 for the process 206, as well as a trust level 224 for an unverified component 208. For example, a trust level above a certain threshold may indicate that the security module 204 does not monitor or challenge the activities of the entity associated with the high trust level. Conversely, the security module 204 may monitor (and challenge) the activities of an entity with a trust level below the threshold. The trust level module 220 may include a level altering module 226. In one example, the module 226 may alter the trust level 222 for the process 206 by either decreasing the trust level 222 or increasing the trust level 222. For example, the trust level 222 of the process 206 at time T1 may be above a certain threshold and the security module 204 may not monitor the activities of the process 206. At a time T2, however, the altering module 226 may decrease the trust level 222 of the process 206 so that the level 222 is below the threshold. With the trust level 222 of the process 206 below the threshold, the security module 204 may alter its monitoring procedures and begin to monitor (and challenge) the activities and behavior of the trusted process 206.

In one configuration, the unverified component 208 may be loaded into the trusted process 206. The component 208 may be disguised as an extension, plug-in, etc. for the process 206, and the process 206 may load the component 208 under these false pretenses. In another embodiment, the unverified component 208 may be injected into the code of the trusted process 206 via direct code injection techniques.

In one embodiment, the security module 204 may include a monitoring module 228 that may monitor certain characteristics and behaviors of the process 206. In addition, the security module 204 may include a tracing module 230. The tracing module 230 may determine the origin of a particular event or behavior. For example, the unverified component 208 may cause a particular event or activity to be engaged. The tracing module 230 may trace the origin of this event or activity back to the unverified component 208.

The security module 204 may further include an evaluation module 232. The module 232 may continuously evaluate a security risk level associated with the process 206 and the unverified component 208 that is loaded on the process 206. The evaluation module 232 may determine when the security risk posed by the unverified component 208 reaches a predetermined threshold. In one embodiment, a termination module 234 may terminate the process 206 when the security risk surpasses the predetermined threshold. In addition, the termination module 234 may delete or remove the unverified component 208 and its associated settings from the client 202 when the process 206 is terminated.

Figure 3:
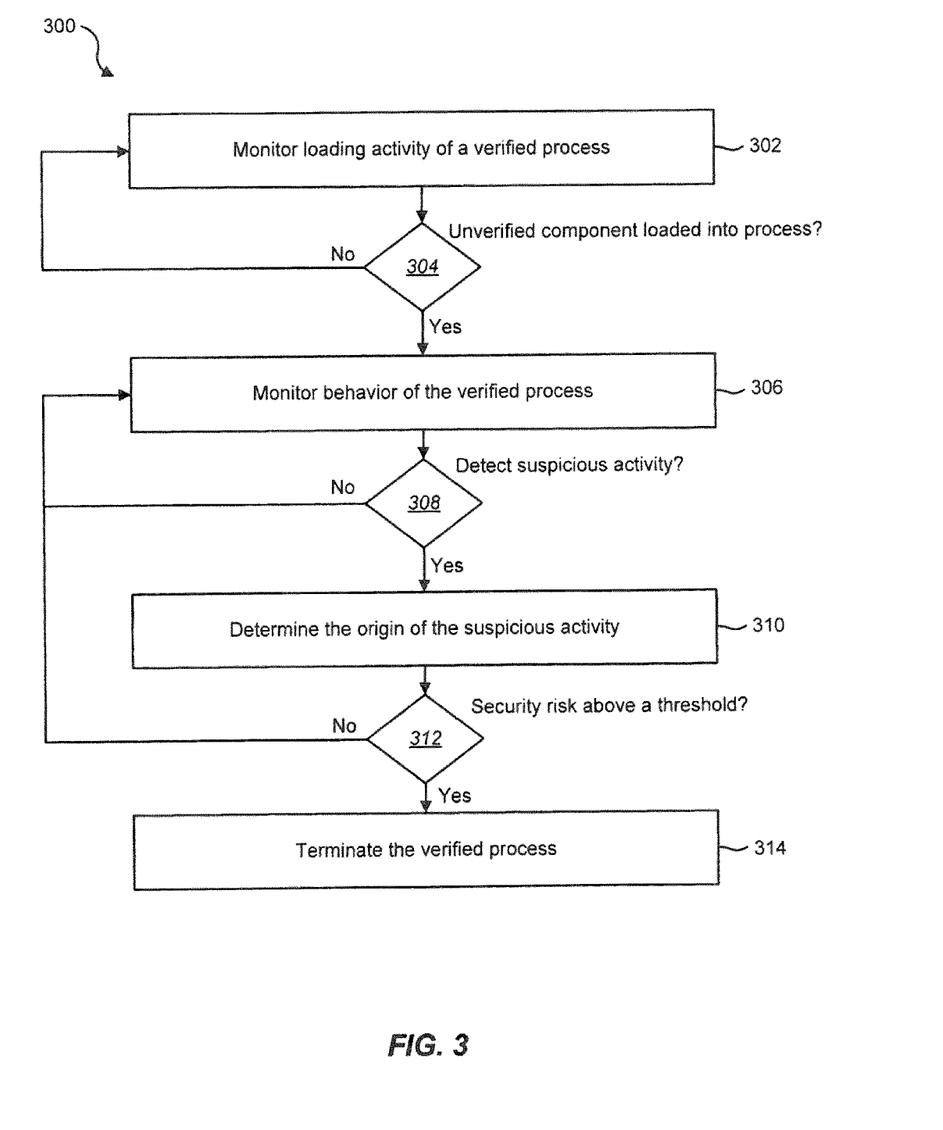
FIG. 3 is a flow diagram illustrating one embodiment of a method for combating threats originating from a non-process based component that may be hosted by a trusted process.

FIG. 3 is a flow diagram illustrating one embodiment of a method 300 for combating threats originating from a non-process based component that may be hosted by a trusted process. In one configuration, the method 300 may be implemented by the security module 104.

In one example, the loading activity of a verified (or trusted) process may be monitored 302. For example, the security module 104 may monitor 302 the verified process for non-process based components being loaded to the verified process. A determination 304 may be made as to whether an unverified component is loaded into the process. For example, a determination 304 may be made as to whether the verified process loads an untrusted or unverified component. In addition, a determination 304 may be made as to whether an unverified component is injected into the code of the verified process.

If it is determined 304 that an unverified component has not been loaded into the verified process, the method 300 may return to continue monitoring 302 the loading activity of the verified process. If, however, it is determined 304 that the an unverified component has been loaded into the verified process, the behavior of the verified process may be monitored 306. In other words, when an unverified component is loaded into the process, the behavior, events, etc., originating from the verified process may be monitored 306. Before an unverified non-process based component is loaded into the verified process, the security software may not monitor the behavior, activity, etc. of the verified process.

In one embodiment, a determination 308 may be made as to whether suspicious activity is detected. For example, suspicious activity may include modifying a system configuration setting, modifying a portable executable ("PE") file, deleting a PE file, creating a PE, etc. If suspicious activity has not been detected, the method 300 may return to continue monitoring 306 the behavior of the verified process. If, however, suspicious activity has been detected, the origin of the suspicious activity may be determined 310.

An additional determination 312 may be made as to whether the origin of the suspicious activity creates a security risk that is above a predetermined threshold. If it is determined 312 that the security risk is not above the predetermined threshold, the method 300 may return to continue monitoring 306 the behavior of the verified process. If, however, the security risk has risen above a predetermined threshold, the verified process may be terminated 314.

Figure 4:
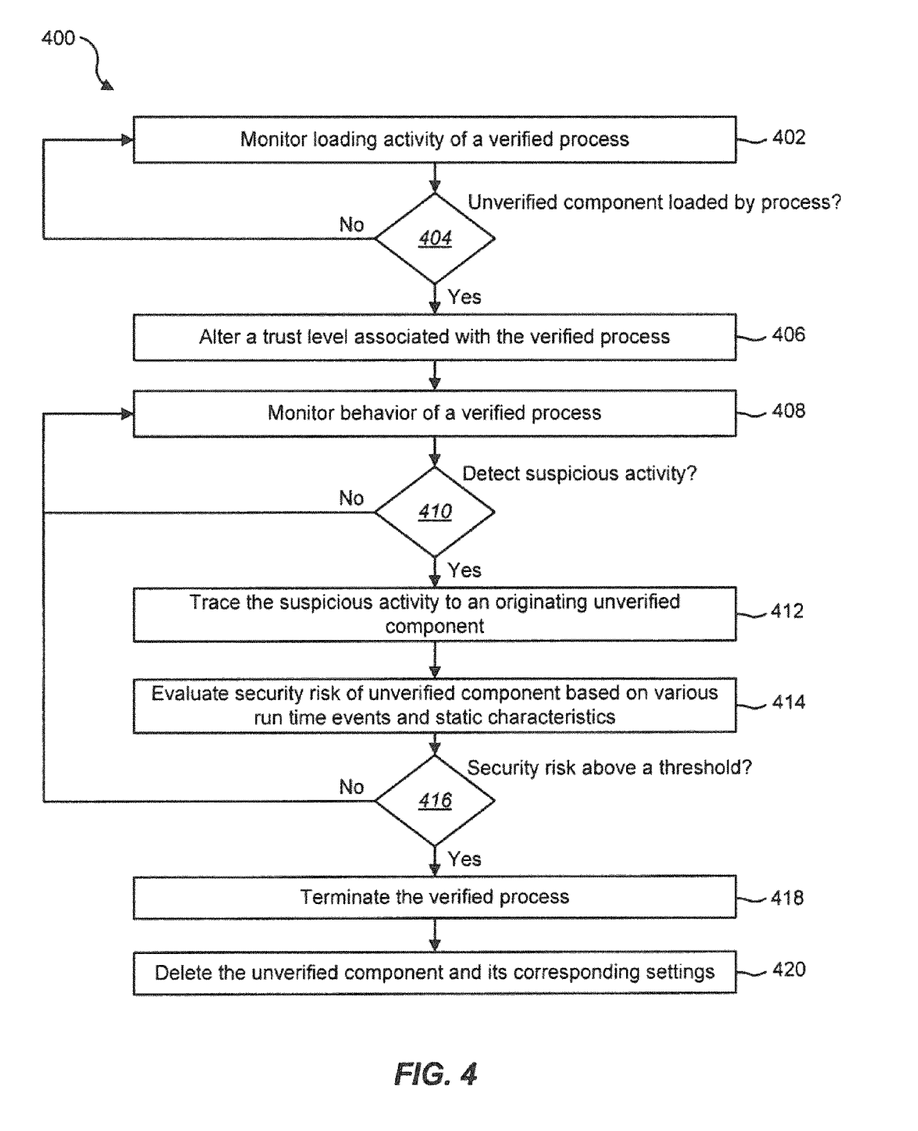
FIG. 4 is a flow diagram illustrating one embodiment of a method for combating threats originating from a non-process based component that may be hosted by a trusted process.

FIG. 4 is a flow diagram illustrating another embodiment of a method 400 for combating threats originating from a non-process based component that may be hosted by a trusted process. In one example, the method 400 may be implemented by the security module 104.

In one embodiment, the loading activity of a verified process may be monitored 402. For example, the security module 104 may monitor the verified process for the loading of dependencies, components, plug-ins, extensions, etc. A determination 404 may be made as to whether an unverified component has been loaded into the process. In one embodiment, components loaded into a trusted process may be assigned a level of trust. For example, the level of trust may be determined from a digital signature or by any other means. The level of trust may be included on an image file associated with an unverified component. An unverified component may have a trust level that is below a "trust threshold". In other words, an unverified component may be a component that is not trusted by the security module 104.

If an unverified component (i.e., a component that is not trusted) has not been loaded into the process, the method 400 may return to continue monitoring 402 the loading activity of the verified process. If, however, an unverified component is loaded into the verified process, a trust level associated with the verified process may be altered 406. In one embodiment, before an unverified component is loaded into a verified process, the trust level of the process may be above a threshold such that the behavior and events originating from the verified process are not monitored and/or challenged. If, however, an unverified component is loaded into a verified process, the trust level of the verified process may be decreased below a threshold. With a decreased trust level below the threshold, the behavior and events of the verified process may now be monitored 408 by the security module 104. In one configuration, more than one unverified components may be loaded into the verified process.

A determination 410 may be made as to whether suspicious activity is detected. For example, the security module 104 may determine 410 whether the verified process performs a suspicious activity or event. If suspicious activity has not been detected, the method 400 may return to continue monitoring 408 the behavior and events of the verified process. If suspicious activity has been detected, the suspicious activity may be traced 412 back to the originating unverified component. In other words, once suspicious activity is detected, the origin of the suspicious activity may be determined. The origin of the suspicious activity may be traced by performing execution call sequence tracing. In one example, the suspicious activity may originate from one of the unverified components hosted by a verified process. In one embodiment, the Windows Operating System ("OS") may provide application programming interfaces ("APIs") that allow code execution to be traced 412 back to various address spaces belonging to different unverified components hosted by the verified process.

In one embodiment, the security risk of the unverified component that originated the suspicious activity may be evaluated 414. For example, the security risk may be evaluated 414 based on various run time events associated with the unverified component. In addition, the security risk of the originating unverified component may be evaluated 414 based on static characteristics possessed by the unverified component in a static file format. A determination 416 may be made as to whether the security risk has risen above a predetermined threshold. If the security risk has not risen above the threshold, the method 400 may return to continue monitoring 408 the behavior of the verified process. If, however, the security risk has risen above the predetermined threshold, the verified process may be terminated 418. In addition, the unverified component and its corresponding settings may be deleted 420. In other words, the verified process may be terminated 418 from running on a client computing devise 102. In addition, the unverified component hosted by the verified process and the associated settings of the unverified component may also be deleted 420 from the client computing device 102. In one embodiment, terminating the verified process and the unverified component with its corresponding settings may terminate the influence the unverified component has over the behavior of the verified process. Malicious components hosted in trusted software/processes may be detected and the potential harm from these components may be prevented.

Figure 5:
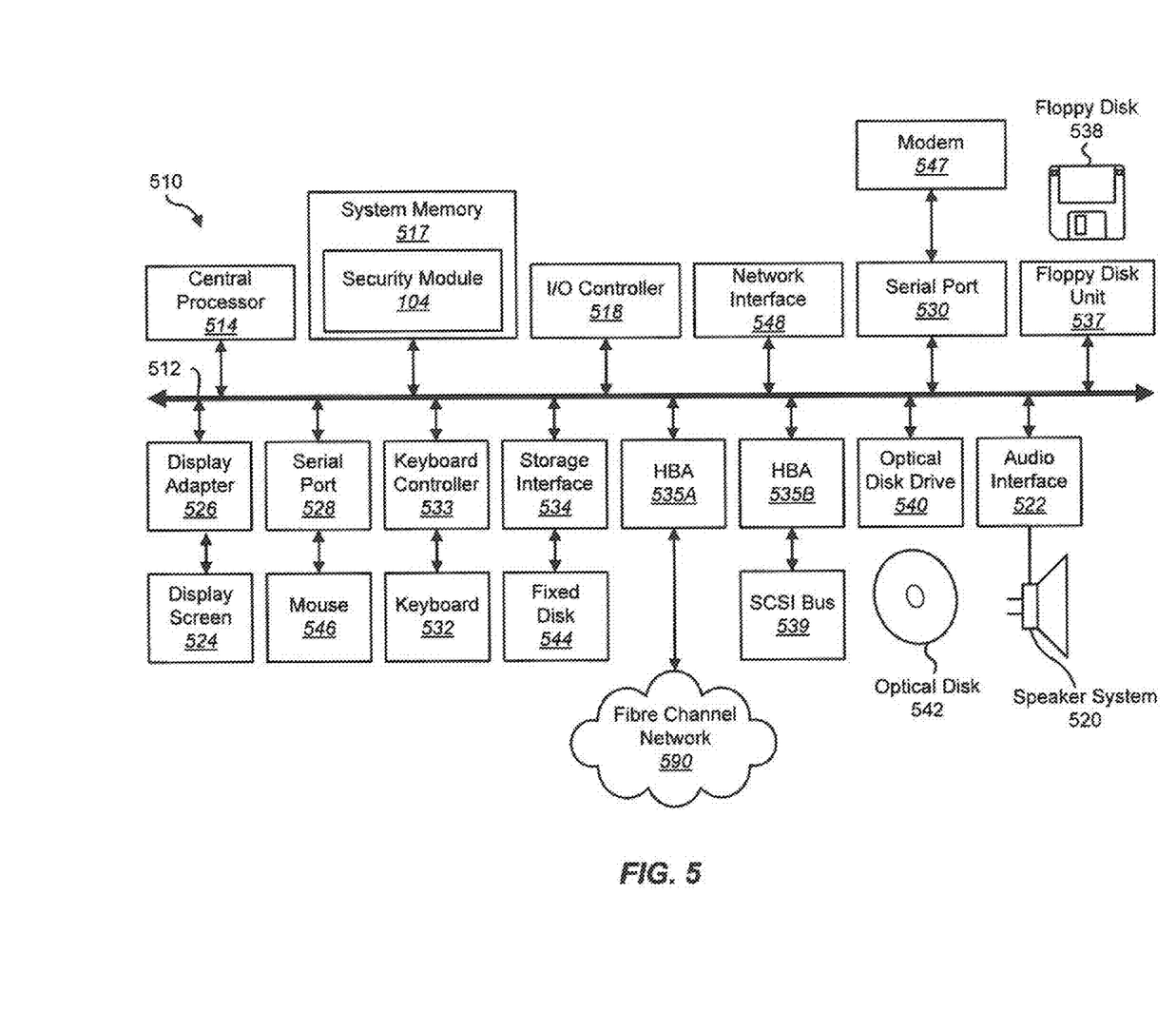
FIG. 5 depicts a block diagram of a computer system suitable for implementing the present systems and methods.

FIG. 5 depicts a block diagram of a computer system 510 suitable for implementing the present systems and methods. Computer system 510 includes a bus 512 which interconnects major subsystems of computer system 510, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk drive 537 operative to receive a floppy disk 538, a host bus adapter (HBA) interface card 535A operative to connect with a Fibre Channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. For example, the security module 104 to implement the present systems and methods may be stored within the system memory 517. Applications resident with computer system 510 are generally stored on and accessed via a computer readable medium, such as a hard disk drive (e.g., fixed disk 544), an optical drive (e.g., optical drive 540), a floppy disk unit 537, or other storage medium. Additionally, applications can be in the form of electronic signals modulated in accordance with the application and data communication technology when accessed via network modem 547 or interface 548.

Storage interface 534, as with the other storage interfaces of computer system 510, can connect to a standard computer readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 5 need not be present to practice the present disclosure. The devices and subsystems can be interconnected in different ways from that shown in FIG. 5. The operation of a computer system such as that shown in FIG. 5 is readily known in the art and is not discussed in detail in this application. Examples of the computer system 510 may include smart phones, personal digital assistants (PDAs), and other mobile internet devices (MIDs) and netbooks, any of which may host an email client. Code to implement the present disclosure can be stored in computer-readable storage media such as one or more of system memory 517, fixed disk 544, optical disk 542, or floppy disk 538. The operating system provided on computer system 510 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 6:
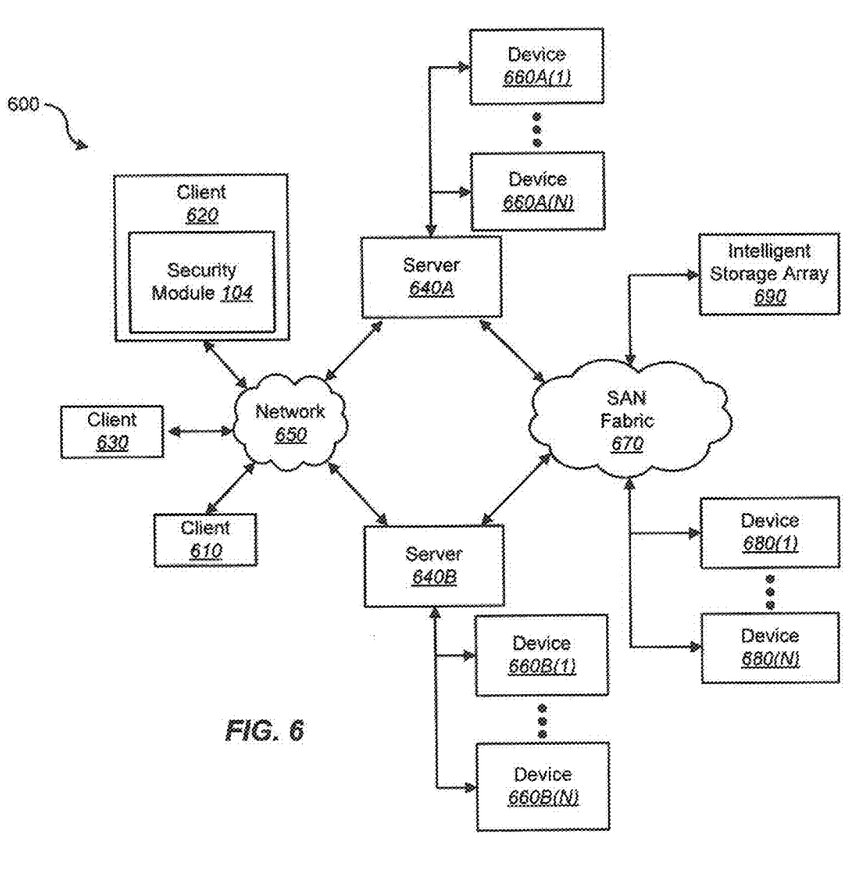
FIG. 6 is a block diagram depicting a network architecture in which client systems and storage servers are coupled to a network.

FIG. 6 is a block diagram depicting a network architecture 600 in which client systems 610, 620 and 630, as well as storage servers 640A and 640B (any of which can be implemented using computer system 510), are coupled to a network 650. In one embodiment, the security module 104 to implement the present systems and methods may be located within a client system 610, 620, 630. The storage server 640A is further depicted as having storage devices 660A(1)-(N) directly attached, and storage server 640B is depicted with storage devices 660B(1)-(N) directly attached. Storage servers 640A and 640B are also connected to a SAN fabric 670, although connection to a storage area network is not required for operation of the disclosure. SAN fabric 670 supports access to storage devices 680(1)-(N) by storage servers 640A and 640B, and so by client systems 610, 620 and 630 via network 650. Intelligent storage array 690 is also shown as an example of a specific storage device accessible via SAN fabric 670.

With reference to computer system 510, modem 547, network interface 548 or some other method can be used to provide connectivity from each of client computer systems 610, 620 and 630 to network 650. Client systems 610, 620 and 630 are able to access information on storage server 640A or 640B using, for example, a web browser or other client software (not shown). Such a client allows client systems 610, 620 and 630 to access data hosted by storage server 640A or 840B or one of storage devices 660A(1)-(N), 660B(1)-(N), 680(1)-(N) or intelligent storage array 690. FIG. 6 depicts the use of a network such as the Internet for exchanging data, but the present disclosure is not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for preventing threats originating from a non-process based component hosted by a trusted process, comprising:

monitoring, by a hardware processor, loading activity of the trusted process;

altering, by the hardware processor, a trust level associated with the trusted process when an unverified component is loaded into the trusted process;

upon altering the trust level of the trusted process, monitoring, by the hardware processor, events performed by the trusted process for a suspicious activity that comprises a portable executable ("PE") file modification, PE file deletion, or PE file creation;

assigning a trust level on an image file to the unverified component based on a digital signature of the unverified component;

calling, by an operating system, an application programming interface to trace code execution by the trusted process;

tracing the code execution of the suspicious activity back to an address space belonging to the unverified component that originated the suspicious activity;

determining whether security risk associated with the unverified component that originated the suspicious activity is above a predetermined threshold; and upon determining that the security risk associated with the unverified component that originated the suspicious activity is above the predetermined threshold, terminating, by the hardware processor, the trusted process and deleting the unverified component that originated the suspicious activity.

2. The method of claim 1, wherein the unverified component is a non-process based dynamic link library ("DLL").

3. The method of claim 1, wherein the suspicious activity further comprises a system configuration setting modification.

4. The method of claim 1, further comprising identifying the unverified component that originated the suspicious activity.

5. The method of claim 1, further comprising evaluating the security risk associated with the unverified component that originated the suspicious activity based on a run time event associated with the unverified component.

6. The method of claim 1, further comprising evaluating the security risk associated with the unverified component that originated the suspicious activity based on static characteristics possessed by the unverified component in a static file format.

7. The method of claim 1, wherein the unverified component comprises a non-process based plug-in or a non-process based extension to the trusted process.

8. A computer system configured to prevent threats originating from a non-process based component hosted by a trusted process, comprising:

a processor;

a memory in electronic communication with the processor, wherein the memory stores computer executable instructions that when executed by the processor cause the processor to perform the steps of:

monitoring loading activity of the trusted process;

altering a trust level associated with the trusted process when an unverified component is loaded into the trusted process;

upon altering the trust level of the trusted process, monitoring events performed by the trusted process for a suspicious activity that comprises a portable executable ("PE") file modification, PE file deletion, or PE file creation;

assigning a trust level on an image file to the unverified component based on a digital signature of the unverified component;

calling an application programming interface to trace code execution by the trusted process;

tracing the code execution of the suspicious activity back to an address space belonging to the unverified component that originated the suspicious activity;

determining whether security risk associated with the unverified component that originated the suspicious activity is above a predetermined threshold; and upon determining that the security risk associated with the unverified component that originated the suspicious activity is above the predetermined threshold, terminating the trusted process and deleting the unverified component that originated the suspicious activity.

9. The computer system of claim 8, wherein the unverified component is a non-process based dynamic link library ("DLL").

10. The computer system of claim 8, wherein the suspicious activity further comprises a system configuration setting modification.

11. The computer system of claim 8, wherein the executable instructions further cause the processor to perform the step of identifying the unverified component that originated the suspicious activity.

12. The computer system of claim 8, wherein the executable instructions further cause the processor to perform the step of evaluating the security risk associated with the unverified component that originated the suspicious activity based on a run time event associated with the unverified component.

13. The computer system of claim 8, wherein the security module is further configured to evaluate the security risk associated with the unverified component that originated the suspicious activity based on static characteristics possessed by the unverified component in a static file format.

14. A non-transitory computer-readable storage medium storing computer executable instructions that when executed by a processor cause the processor to perform the steps of:

monitoring loading activity of the trusted process;

altering a trust level associated with the trusted process when an unverified component is loaded into the trusted process;

upon altering the trust level of the trusted process, monitoring events performed by the trusted process for a suspicious activity that comprises a portable executable ("PE") file modification, PE file deletion, or PE file creation;

assigning a trust level on an image file to the unverified component based on a digital signature of the unverified component;

calling an application programming interface to trace code execution by the trusted process;

tracing the code execution of the suspicious activity back to an address space belonging to the unverified component that originated the suspicious activity;

determining whether security risk associated with the unverified component that originated the suspicious activity is above a predetermined threshold; and upon determining that the security risk associated with the suspicious activity is above the predetermined threshold, terminating the trusted process and deleting the unverified component that originated the suspicious activity.

* * * * *